United States Patent [19]

Taylor

[11] Patent Number: 4,820,863
[45] Date of Patent: Apr. 11, 1989

[54] SURFACE ACTIVE POLYCARBODIIMIDES

[75] Inventor: James W. Taylor, S. Charleston(Kanawha), W. Va.

[73] Assignee: Union Carbide Corporation, Danbury, Conn.

[21] Appl. No.: 845,982

[22] Filed: Mar. 31, 1986

[51] Int. Cl.$^4$ .................. B01F 17/16; C07C 125/06
[52] U.S. Cl. .................. 560/115; 252/312; 252/355; 252/356; 252/357; 524/832; 564/252
[58] Field of Search .............. 252/356, 357; 564/252; 560/24, 115

[56] References Cited

U.S. PATENT DOCUMENTS

| | | | |
|---|---|---|---|
| 2,941,966 | 6/1960 | Campbell | 564/252 X |
| 3,839,413 | 10/1974 | Wolff et al. | 252/357 X |
| 3,953,505 | 4/1976 | Schibler et al. | 252/DIG. 1 |
| 3,960,781 | 6/1976 | Freis et al. | 252/DIG. 1 |
| 3,996,154 | 12/1976 | Johnson et al. | 252/356 X |
| 4,321,394 | 3/1982 | Schäfer et al. | 564/252 X |
| 4,487,964 | 12/1984 | Watson, Jr. et al. | 564/252 |
| 4,612,054 | 9/1986 | Hamon | 106/264 |

FOREIGN PATENT DOCUMENTS

7304336  10/1973  Netherlands ................ 252/357

Primary Examiner—Richard D. Lovering
Attorney, Agent, or Firm—Jean B. Mauro

[57] ABSTRACT

Disclosed are surface-active polycarbodiimides containing a hydrophilic portion and a hydrophobic portion joined through the reaction of a carbodiimide group with a reactive functional group. The surface-active polycarbodiimides may be linear or branched, monodisperse or polydisperse, but preferably are of the branched, monodisperse type. The surface-active polycarbodiimides are useful as surfactants, and are particularly useful as emulsifiers in cross-linkable, carboxyl-containing resin systems, such as aqueous latexes.

3 Claims, 1 Drawing Sheet

REACTION MECHANISM

FIG. 1

Part 1

Part 2

SURFACE ACTIVE POLYCARBODIIMIDES

BACKGROUND OF THE INVENTION

1. Field of the Invention

This invention relates to surface-active difunctional and multifunctional (i.e., with more than two carbodiimide groups) carbodiimides and their preparation and use as dispersing agents for polycarbodiimides which are useful as cross-linking agents for carboxyl-containing organic resins, preferably latex resins, or neutralized, carboxylated water-soluble resins, and carboxylated solution resins.

2. Summary of the Prior Art

Carbodiimides are a well-known class of organic compounds. Dicyclohexylcarbodiimide has been useful for many years as a condensation agent in the preparation of peptides, as described by Sheelan and Hess (J. Chem. Soc., 77, 1067 (1955)). Monodisperse, difunctional carbodiimide compounds have been prepared by the desulfurization of thioureas using hypochlorite. Such compounds were prepared, for example, by Iwakura, et al. (Makromol. Chem., 98, 21 (1966); Bull. Chem. Soc. Jpn., 40, 2383 (1967)). Multifunctional, linear, polydisperse polycarbodiimides have been prepared by Campbell from diisocyanatoalkanes or diisocyanatoarenes using a phospholine oxide catalyst (U.S. Pat. No. 2,941,966 (1960)). Use of sodium hypochlorite to desulfurize thioureas to prepare multifunctional carbodiimides, i.e., with more than two carbodiimide groups, is known but is reported to be very difficult (Wagner, et al., Angew. Chem., 70, 819 (1981)). The art is summarized in Chem. Rev., 81, 589 (1981).

The use of polydisperse polycarbodiimides as cross-linkers for carboxylated latex resins and neutralized carboxylated water-soluble polymers is known in the art. Specifically, co-assigned U.S. application Ser. No. 691,378, filed Jan. 15, 1985 and now abandoned (the disclosure of which is incorporated herein by reference), teaches the preparation of useful polycarbodiimides, useful as cross-linkers in carboxyl-containing resin systems, from certain mono-, di-, and tri-functional cycloaliphatic or saturated aliphatic isocyanates, in which the mono- and diisocyanates are optional, and co-assigned U.S. Pat. No. 4,487,964 discloses a method for the preparation of useful polycarbodiimide cross-linkers from mixed aromatic/aliphatic isocyanates. Of particular interest are the monodisperse, multifunctional carbodiimides disclosed in my co-pending, co-assigned U.S. patent application Ser. No. 747,190, filed June 21, 1985, now abandoned, which will be referred to in detail below.

The resin systems in which carbodiimide cross-linkers are particularly useful are those in which the material contains reactive carboxyl groups, such as are typically found in aqueous latexes used for coatings. In the past, in order to prepare the cross-linking carbodiimide in compatible emulsion form, it has been necessary to subject the carbodiimide to high-energy shear forces in the presence of relatively high concentrations of surfactants. Usually, this has required the employment of special, high-shear mixing equipment, and has exacted the further penalty of high energy costs. Since emulsions are often difficult to keep stabilized during storage, it has often been necessary to avoid storage and shipment of the carbodiimide emulsion and, instead, to suffer the additional inconvenience of having to add emulsification equipment to the coating line.

The present invention effectively solves many of those problems of the prior art by providing polycarbodiimides which are relatively easy and inexpensive to emulsify, and in many cases, are virtually self-emulsifying. The are readily compatible with commercial, carboxyl-containing latexes, and are quite stable. In the event that it is considered convenient to utilize an emulsification step in-line, the emulsion may be effectively prepared using relatively simple mixing equipment, rather than expensive, high-shear devices.

According to the present invention there is provided a surface-active polycarbodiimide of the formula $$R-X-R' \qquad (I)$$

wherein R is a residue of a hydrophobic organic compound containing at least two carbodiimide groups; R' is a residue of an organic compound having a hydrophilic segment and at least one functional group capable of reacting with a carbodiimide group; and X is a group formed by the reaction of said carbodiimide group with a said functional group.

Likewise, there is provided a cross-linker emulsion comprising an admixture, in aqueous medium, of (a) a hydrophobic polycarbodiimide, and (b) a polycarbodiimide of formula (I).

Similarly, there is provided a cross-linkable, carboxyl-containing emulsion (e.g., a latex) or a neutralized, carboxylated, water-soluble organic resin, in combination with the cross-linker emulsion described above, as well as the cross-linked product thereof.

In addition, this invention provides methods for making the surface-active polycarbodiimide of formula I, for making the cross-linker and cross-linkable emulsions, and for cross-linking such emulsions by allowing volatilization of certain materials, to produce a cross-linked product.

As used herein, all defined groups are intended to include such groups containing any substitution which does not significantly interfere with the use of the carbodiimides for their intended purpose. Likewise, all aromatic groups are intended to include fused aromatic rings as well as substituted aromatic groups.

Also used herein, the term "polycarbodiimide" is intended to include both monodisperse and polydisperse types of carbodiimides. The terms "multifunctional" and "polyfunctional," to the extent used, are used interchangeably and only in reference to monodisperse, polycarbodiimides.

DETAILED DESCRIPTION OF THE INVENTION

Incorporation of a carbodiimide cross-linker into formulations containing carboxylic, water-borne polymers requires either that the cross-linker be emulsified mechanically, or made surface-active for easy dispersion. The emulsification step is cumbersome, and emulsified carbodiimides are subject to a slow, unpreventable reaction with water to form ureas, which limits their shelf-life. The present invention permits substantial simplification or elimination of the mechanical emulsification step. This is achieved by use of a chemically modified carbodiimide which is a surface-active species heretofore unknown to the art.

The surface-active carbodiimide of this invention can be prepared and used as a surfactant by adding it, with agitation, to solutions of polycarbodiimides, as with surfactants of the prior art. However, it is a surprising advantage of this invention that it permits the in situ preparation of dispersions of polycarbodiimides. That is, the polycarbodiimide to be emulsified can be added directly to a carboxyl-containing medium, e.g., a latex, and the polycarbodiimide can then be emulsified in the medium by addition, with stirring, of the surface-active polycarbodiimide of this invention. The mild agitation routinely supplied for mixing will ordinarily be adequate to effect the dispersion. However, if smaller droplet size is desired, shear can be increased by use of more vigorous agiation. If very small droplets are desired, any of the various homogenizing mixers known to the art can be employed. In all cases, however, it will be found that the surface-active carbodiimide of this invention produces dispersions moe readily for any given level of agitation than are available using surfactants of the prior art. It is to be understood that mixtures of polycarbodiimides can also be readily emulsified using this invention. If the surface-active carbodiimide is prepared in situ in a mixture of polycarbodiimides, it will be understood that surface-active species will be formed from each of the polycarbodiimide structures present, according to the reaction kinetics of each species.

The surface-active species of this invention is a polycarbodiimide resin conforming to the general formula (I): R—X—R', as described above. In theory, R can be the residue of any hydrophobic organic group containing at least two carbodiimide linkages, one to form linkage X, and the other to react with a carboxyl group of the resin to be cross-linked. The advantage of this latter reaction is that it binds the surface-active component to the cross-linked resin matrix, thereby preventing migration or "blushing" of the surfactant to the surface of a cross-linked coating. It is also possible, in fact, desirable, for R to contain more than two carbodiimide groups, since the surfactant itself can then participate in the cross-linking reaction.

In formula (I), R' can be the residue of any group having sufficient hydrophilicity to impart to the molecule the necessary surface-active characteristics. R' must, of course, be derived from a compound which contains, either initially or by modification, a group capable of forming linkage X by reaction with a carbodiimide group. It will be understood, of course, that if R' contains more than one such reaction group, such group should be chosen to be nonreactive or only relatively slowly reactive with carbodiimide groups, so as to minimize any gellation or undesired cross-linking. As will be described more fully below, X may conveniently be the reaction product of a carbodiimide with an isocyanate. Various reactive species other than —NCO are, however, also useful. Such reactive species would include —COOH, carboxyl amine salts, —SH, —OH, and —NH2, as well as others known to the art. It will be understood by those skilled in the art that the reaction between an isocyanate and a carbodiimide is an equilibrium reaction; thus, it may not ordinarily be possible to isolate the surface-active carbodiimide so prepared. (However, in at least one system it has been shown to be possible to isolate the carbodiimide/isocyanate dimer. See Ulrich, et al., J. Am. Chem. Soc., 94, 3484 (1972).) If it is desired to utilize this reaction, it may be advisable to add the isocyanate-terminated surfactant to a high concentration of carbodiimide, since the reaction is then driven essentially to completion by "swamping" the isocyanate groups with carbodiimide groups.

As implied above, there are no inherent limitations on the structure of R', other than the obvious facts that it should not be incompatible with carbodiimide resins or carboxyl-containing emulsions. For ease of preparation, it will be apparent that various commercially available non-ionic surfactants are inherently reactive with carbodiimide groups or can be modified to make them reactive with carbodiimide groups to form X. For example, poly(oxyalkylene)-based surfactants, such as those poly(ethylene oxide)-based surfactants available (from Union Carbide Corp.) under the trademark "Tergitol," contain free hydroxyl groups which can react with carbodiimide groups, or can be modified by reaction with, e.g., a diisocyanate to provide a free isocyanate group to react with a carbodiimide group. A preferred hydroxyl-containing hydrophilic species comprises the poly(ethylene glycol) resins available (from Union Carbide Corp.) under the trademark "Carbowax." Of these, those end-capped with a methoxy or ethoxy group are particularly preferred. Other hydroxy-containing hydrophilic species include poly(propylene oxide) resins.

The reaction to form linkage X in formula (I) should be carried out in advance of the use of the surface-active carbodiimide to form the cross-linker dispersion. The various reactions possible to form X will depend, of course, upon the reactive groups selected, and will be performed according to procesures well understood in the art.

The linkage X represents some general functional group formed through any of the following cyclo-addition (1-2), addition (3-6), or cyclo-reversion (7) reactions.

The groups (X) formed from the above reactions (1–7) are the uretidinone (1), diazetidine thione (2), N-acyl urea (3), guanidine (4), isourea (5), isothiourea (6), and carbodiimide (7).

If it is necessary or desired to modify the surfactant R' by addition of a carbodiimide-reactive group, the modification should be carried out in advance of the reaction to form linkage X. Again, the various reactions possible to effect the modification will depend upon the reactive groups selected, and will be performed according to procedures well understood in the art. In general, however, a nonionic surfactant, R', which is terminated with one of the reactive groups shown above is added to a solution of the carbodiimide cross-linker under the necessary conditions to ensure a reaction between the reactive groups attached to the nonionic surfactant and the carbodiimide groups of the multi-functional carbodiimide.

As previously indicated, the surface-active carbodiimide of formula (I) can be effectively used in a variety of ways. It can be added to a hydrophobic carbodiimide, preferably in organic solvent solution, to form a surface-active material, which can then be added to a cross-linkable latex. The surface-active carbodiimide can alternatively be formed in situ right in the hydrophobic carbodiimide solution itself. The surface-active carbodiimide also can be added to a mixture of latex and hydrophobic carbodiimide.

In preparing dispersions utilizing the surface-active carbodiimides of this invention, no particular precautions or unusual techniques are required. Procedures to be used are those familiar to the art. In general, however, it may be stated that materials should be added to each other gradually, with moderate stirring and over a reasonable time frame. It is usually preferable to add the oil phase to the water phase, i.e., add the surfactant solution to the latex. It is, however, possible to add the water phase to the oil phase. This may, in fact, be desirable for polydisperse polycarbodiimides (i.e., dispersing index D>1) since it tends to produce smaller droplet size for mixing energy expended. A defoamer may be used, if desired, provided it is not incompatible with the surface-active polycarbodiimide.

The concentration of the surface-active carbodiimide necessary to effect satisfactory emulsification is not considered to be narrowly critical, and will be a matter of routine experimentation. Optimum concentration can be expected to depend to some extent, as with any other surface-active material, upon the chemical structure of the material, e.g., the size and solubility of the hydrophilic moiety. As a general guideline, however, the concentration of the surface-active carbodiimide can be expected to be in the range of about 0.5 to about 10%, preferably about 0.5 to about 3%, more preferably about 1.5%, based upon the total weight of the oil phase, i.e., polycarbodiimide plus solvent. Increasing the surfactant concentration tends to decrease droplet size for any given hydrophile moiety. In addition, it should be kept in mind that if the surface-active carbodiimide is prepared from a resin having more than two carbodiimide groups, the surface-active carbodiimide itself will participate in the ultimate cross-linking reaction; accordingly, the contribution of the surface-active carbodiimide should be taken into account when considering the over-all concentration of cross-linking emulsion.

It is also possible to utilize the surface-active carbodiimide of this invention in combination with other surfactants known to the art. If such supplemental surfactants are used, it is preferred that they be of the same ionic charge as any surfactants already present in the system (e.g., a latex) to which the surface-active carbodiimide is to be added, in order to minimize possible compatibility problems. However, the combination of the nonionic surface-active carbodiimide of this invention with ionic types is also useful. Such combination might be desirable when, for instance, emulsifying a polydisperse polycarbodiimide or a mixture of carbodiimides containing a polydisperse type. If a supplemental surfactant is used, it is preferable that it be of the anionic type, but should not, of course, contain chemical moieties which are reactive with carbodiimide functionality. Thus, surfactants containing reactive carboxyl groups, e.g., those based upon stearic or oleic acids, should be avoided. Preferred are those surfactants based upon sulfonic salts or upon sulfates. The concentration ratio of surface-active carbodiimide to supplemental surfactant should be in the range of about 30/70 to about 70/30 by weight, preferably about 40/60 to about 60/40, most preferably about 50/50. It will be understood that any ionic supplemental surfactant used must be selected to be compatible with any surfactant already present in the carboxyl-containing material to be cross-linked. For example, many latexes contain cationic surfactant residues, so should not be used with anionic supplemental surfactants.

Some other useful anionic surfactants are as follows:

| Trade Name | Chemical Name | Manufacturer |
| --- | --- | --- |
| Aerosol MA-80 | Sodium dihexyl sulfosuccinate | American Cyanamid |
| Akyposol DS-28L | Sodium Laurylether sulfate | Chem-Y |
| Akyposol ALS-33 | Ammonium Lauryl sulfate | Chem-Y |
| Akyposol NLS | Sodium Lauryl sulfate | Chem-Y |
| Akyposol TLS-42 | Triethanolamine Lauryl sulfate | Chem-Y |
| Alcoil 12S | Sodium-ammonium salts of alkyl aryl sulfonate | Henkel Argentina |
| Alcoil A550T | Triethanol amine salt of alkyl sulfonate | Henkel Argentina |
| Cycloryl 599 | Sodium dodecylsulphate | Witco Chemical |
| Triton GR-5M | Dioctyl sodium sulfosuccinate | Rohm & Haas |

Some useful nonionic surfactants (hydroxyl-terminated) are listed below.

| Trade Name | Chemical Name | Manufacturer |
| --- | --- | --- |
| Igepal Series | Alkylphenoxypoly(ethylene oxy)ethanol | GAF Corporation - Chemical Products |
| Triton DN-14 | Alkylpolyether alcohol | Rohm & Haas |
| Triton N-57 | Nonylphenoxyl polyethoxy ethanol (Tergitol Series) | Rohm & Haas |
| Triton X-15 | Octylphenoxypolyethoxy ethanol | Rohm & Haas |
| Trycol OAL-23 | Ethoxylated oleyl alcohol | Emery Industries |

While probably not reqired for all possible systems within the scope of this invention, it is considered desirable and preferable to utilize a compatible solvent in the preparation of the surface-active carbodiimide and/or the cross-linker emulsion. There are no particular limitations known on the choice of a suitable solvent or combination of solvents, other than such solvent(s) should be non-reactive in the systems used.

Solvents for the surface-active carbodiimide and/or the cross-linker emulsion include liquid compounds, or their combinations, which contain ester, ether, ketone, or alcohol functionality. Examples of such solvents include ethyl acetate, isopropyl acetate, butyl acetate, amyl acetate, butyl phthalate, methyl CELLOSOLVE Acetate, CELLOSOLVE Acetate, Butyl CELLOSOLE Acetate, CELLOSOLVE Acetate, Butyl CELLOSOLVE Acetate, CARBITOL Acetate, butyl CARBITOL Acetate, glyceryl triacetate, hexylene glycol diacetate, methyl ethyl ketone, diethyl ketone, methyl isobutyl ketone, ethyl butyl ketone, acetophenone, diisobutyl ketone, isophorone, cyclohexanone, isopropanol, isobutanol, 1-pentanol, 2-methyl pentanol, Methyl CELLOSOLVE, Butyl CELLOSOLVE, Hexyl CELLOSOLVE, Methyl CARBITOL, Propasol B, Propasol BEP, Propasol M, and phenyl glycol ether.

The primary purpose of the solvent is to solubilize the surfactant in the presence of the cross-linker carbodiimide resin. If no solvent is used, a two-phase system is likely to result, since the cross-linker carbodiimide resin is hydrophobic and the surface-active carbodiimide resin is, of course, hydrophilic. It will be understood, of course, that the more nearly hydrophilic the carbodiimide molecule is, the less the need for a solvent. Thus, solvent use or concentration can be reduced within the scope of this invention by designing the surface-active carbodiimide to contain ester groups or pendent hydroxyl groups, which can hydrogen-bond with water.

Modest agitation of the systems of this invention will produce droplet sizes in the range of about 0.4 to about 10 microns. As indicated previously, this droplet size can be readily reduced by application of somewhat higher shear agitation, and/or increasing the level of surfactant in the oil phase. For use with latexes, it is desirable that the droplet size be in the range of about 0.4 to about 0.8 micron in order to more nearly match the particle size typically found in latexes. In general, a longer hydrophilic chain in the surfactant portion of the surface-active carbodiimide gives a more stable emulsion compared to a shorter chain at a given level of surfactant.

The carbodiimide cross-linker resin used may theoretically be any polycarbodiimide resin known to the art and which is not incompatible with the carboxyl-containing, water-borne resin emulsion of this invention. Thus, for example, the cross-linker resin may potentially be selected from those taught by U.S. Pat. Nos. 3,929,733 and 3,972,933, which disclose linear aromatic polycarbodiimides, 2,853,473 which discloses non-aromatic linear polycarbodiimides, and 4,487,964 which discloses mixed aromatic/aliphatic linear polycarbodiimides.

Particularly preferred are those monodisperse, branched multifunctional carbodiimides disclosed in co-pending, co-assigned U.S. patent application Ser. No. 747,190, filed June 21, 1985, now abandoned, the disclosure of which is incorporated herein by reference. Those resins conform to the generalized structure:

Wherein: M and Q may be the same or different and each represents the residue of a compound adapted to function as a site for branching; R and R' may be the same or different and represent an alkyl (including cycloalkyl) or aryl, radical or diradical which may be or contain cyano, nitro, halo, alkyl sulfide, dialkylaminoalkyl, substituted saline, alkoxy, and aryloxy moieties, and other substituted species of any of the foregoing; R" represents the same or different alkyl (including cycloalkyl) or aryl diradical which may contain cyano, nitro, halo, alkyl sulfide, dialkylamino, substituted silane, alkoxy, and aryloxy moieties, and other substituted species of any of the foregoing.

More specifically, these carbodiimdies comprise monodisperse, branched, multifunctional carbodiimides conforming to the structure:

wherein: $R^1$, $R^2$, $R^3$ and $R^4$ may be the same or different and represent organic residues which do not substantially interfere with the multifunctional carbodiimide for its intended purpose; and D is an organic residue.

Still more specifically, these carbodiimides comprise monodisperse, branched, multifunctional carbodiimides conforming to the structure:

wherein: $R^1$, $R^2$, and $R^4$ may be the same or different and represent alkyl groups having 1 to about 12 carbon atoms; $R^5$ and $R^6$ may be the same or different and represent hydrogen, alkyl (including cycloalkyl), aryl, aralkyl, alkaryl, heterocyclic, cyano, nitro, halo, alkyl sulfide, dialkylaminoalkyl, siolane, alkoxy, and aryloxy groups, and substituted species of any of the foregoing; Z is the residue of a compound adapted to function as a site for branching.

The moieties designated M, Q, D, and Z in the above formulas are intended to be quite broad and general in scope. It will be readily appreciated from these formulas that by careful choice of starting materials and reaction sequence, all within the scope of this invention, it will be possible to prepare complex molecular structures. Accordingly, it is to be understood that M, Q, D, and Z are intended to include all structures which do not significantly impair the use of the branched multifunctional carbodiimides for their intended purpose.

Selection of optimum molecular weight for the cross-linker carbodiimide will be a matter of experimentally balancing, for example, such variables as the degree of branching, the distance between carbodiimide moieties, backbone chain length, and the compatibility of the polycarbodiimide with the cross-linkable resin. As a general guideline, referring to formulas I, II and III, the ranges for the subscript letters are:

$n = 0$ to $\sim 6$, preferably 1 to $\sim 2$;
$m = 3$ to $\sim 5$, preferably 3 to $\sim 4$;
$p = 1$ to $\sim 6$, preferably 1 to $\sim 2$;
$q = 0$ to $\sim 4$, preferably 0 to $\sim 3$;
$r = 1$ to $\sim 6$, preferably 1 to $\sim 4$;
$s = 1$ to $\sim 6$, preferably 1 to $\sim 4$;
$t = 1$ to $\sim 6$, preferably 1 to $\sim 4$;
$x = 1$ to $\sim 6$, preferably 1 to $\sim 4$;
$y = 1$ to $\sim 6$, preferably 1 to $\sim 4$;
$z = 1$ to $\sim 6$, preferably 1 to $\sim 4$;
$a = 0$ to $\sim 12$, preferably 1 to $\sim 2$;
$b = 0$ to $\sim 12$, preferably 3 to $\sim 4$;
$c = 0$ to $\sim 12$, preferably 2 to $\sim 3$;
$d = 0$ to $\sim 12$, preferably 1 to $\sim 4$;

The above tabulation is offered with the observations that m must be at least 3 for branching to occur, and that d may be different in different branches.

Another preferred group of polycarbodiimides are those disclosed in co-pending, co-assigned U.S. patent application Ser. No. 691,378, filed Jan. 15, 1985 and now abandoned, the disclosure of which is incorporated herein by reference. These materials comprise polydisperse, linear, polyfunctional polycarbodiimides derived from the reaction of mono-, di-, and tri-cycloaliphatic or saturated aliphatic isocyanates wherein the cycloaliphatic moieties contain from 5 to about 7 carbons and can be substituted with alkyl having 1 to about 6 carbons, and oxygen, and the saturated aliphatic moieties contain from 1 to about 18 carbons, wherein the mono- and triisocyanates are optional.

Such polycarbodiimides can be prepared in a variety of ways. In a preferred synthesis, the polycarbodiimides are prepared by reaction of mono-, di-, and optionally tri-isocyanates, with the easiest structures to conceptualize being based on mono- and diisocyanates in the molar ratio of about 2:1 to about 2:10 to yield the carbodiimide, with evolution of carbon dioxide, by the following generation equation:

This process usually requires a catalyst, and a preferred catalyst is 3-methyl-1-phenyl-2-pholene-1-oxide (which may be abbreviated "MPPO"), having the formula:

It is not necessary to use a triisocyanate. A combination of mono- and diisocyanates in a molar ratio of about 2:2 to about 2:4 is preferred.

The reaction is preferably accomplished in non-reactive solvents, such as, aromatic hydrocarbons having 6 to about 12 carbons, aliphatic esters or glycol diesters, amyl acetate, butyl acetate, propyl propionate, ethyl butyrate, xylene, toluene, diethyl benzene, benzene, diethylene glycolether diacetate, dipropylene glycol ether dibutyrate and hexylene glycol diacetate. The reaction mixture is stirred vigorously, and a small amount of nitrogen is sparged in to assist in driving the reaction to completion by removal of carbon dioxide. Generally, mixtures of isocyanates are employed, with the relative molar proportions of mono-, di- and triisocyanates adjusted to yield the desired product.

In a typical preparation, two moles of butyl isocyanate are reacted with three moles of isophorone diisocyanate to yield an oligomeric polycarbodiimide having approximately four moles of carbodiimide functionality, barring any side reactions. These reactants are charged to approximately 50% by weight of reactant in amyl acetate along with about 0.3% by weight of the catalyst. The mixture would be continuously sparged with a small amount of nitrogen and stirred vigorously while heated to approximately 140° C. and held until complete conversion of the isocyanate to the carbodiimide is observed in the infrared spectrum.

Figure 1:
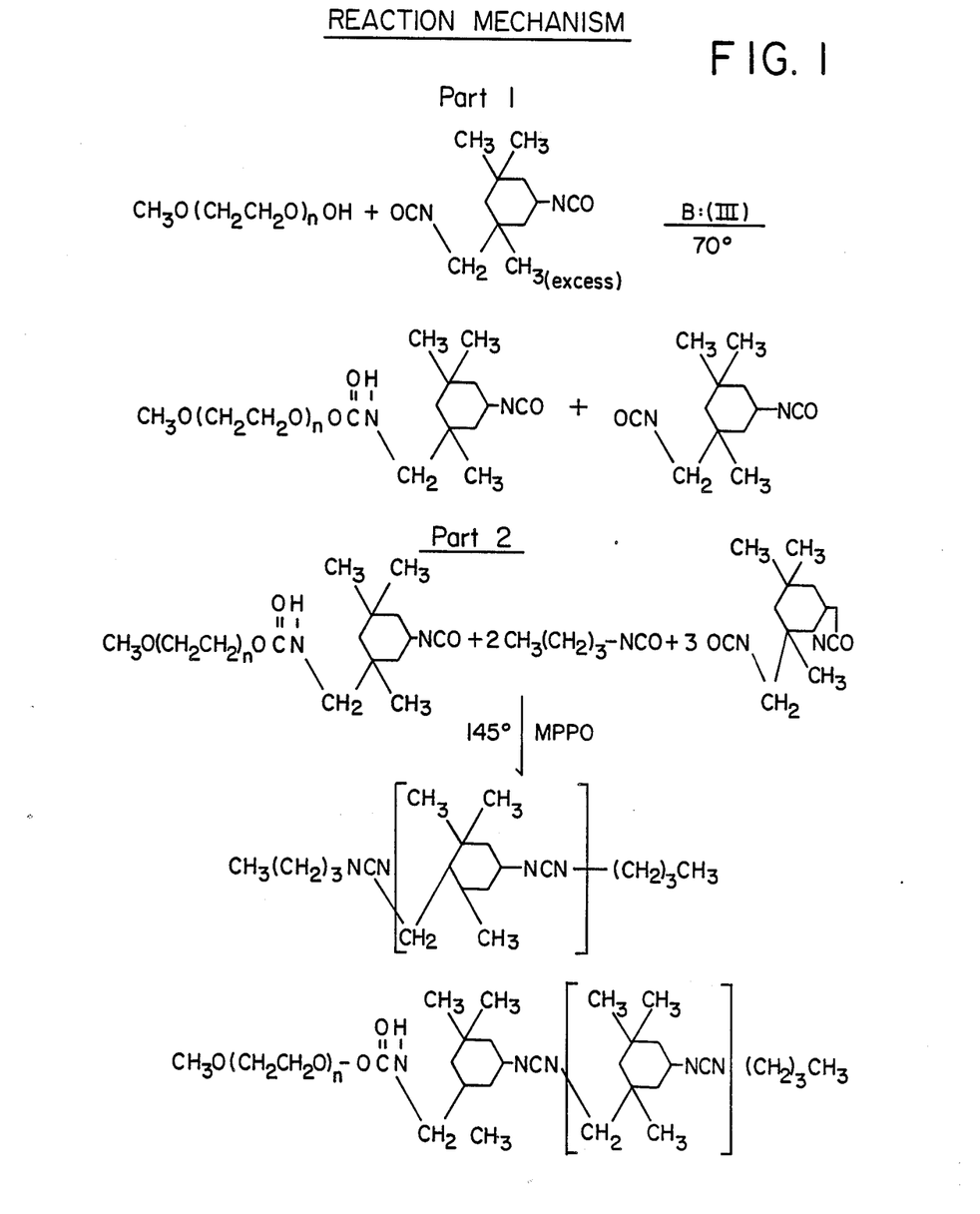

This structure may be made surface-active, according to the invention, through the chemical reactions shown in FIG. 1. These are the chemical reactions occurring, in Examples 1, 3, and 5, below.

Use of this synthesis regime typically results in a broad molecular weight range of about 100 to about 80,000 in the polycarbodiimide product. For a typical product, the number average molecular weight ($M_n$), determined by vapor phase osmometry, would be approximately 795, and the weight average molecular weight ($M_w$), determined by Rayliegh light scattering, would be approximately 2227. This produces a dispersity index, $D = M_w/M_n$, of 2.8.

Many variations on this synthesis regime will be apparent to one skilled in the art.

While the saturated aliphatic isocyanates previously listed include the more widely available commercial materials, many others can be used as exemplified by:
1,4-tetramethylene diisocyanate
1,12-dodecane diisocyanate
cyclobutane-1.3-diisocyanate
cyclohexane-1.3-diisocyanate
cyclohexane-1.4-diisocyanate
hexahydrotolylene-2,4- and -2,6-diisocyanate.

While the solvents previously listed are preferred, many other solvents would be suitable. Requirements for suitable solvents include having a sufficiently high boiling point to allow efficient accomplishment of the desired reaction and that the solvent not contain active hydrogen functionality such as would react with the isocyanate starting material or the carbodiimide product. Exemplary solvents include: ethylbutylketone, acetophenone, propriophenone, diisobutylketone, cyclohexanone, decalin, methyl CELLOSOLVE acetate, CELLOSOLVE acetate, butyl CELLOSOLVE acetate, CARBITOL acetate, butyl CARBITOL acetate, and glycoldiacetate.

Many variations of the catalyst are employable. Examples include the non-oxidized phospholene compound as well as the phoshpolene sulfide. Additional alternatives include substitutions on and for the phenyl group attached to the phosphorous atom, such as by the ethyl moiety. Additional substitutions on the phosphorous ring can be made, as for example: hydrogen, alkenyl, aryl, aralkyl, alkoxy, chlorine, and bromine.

The process need not be operated at 140° C. for acceptable product has also been produced at 130° C. to 160° C. Operation below 120° C. may yield unacceptably long cycle times, while operation at 160° C. or above may yield undesired quantities of by-product.

The following examples illustrate various embodiments of the invention, but do not limit it in any way. All concentrations are by weight. The anionic surfactants used in these examples are as follows:

| Trade Name | Chemical Name |
| --- | --- |
| Aerosol OT-75 | Dioctyl ester of sodium sulfosuccinic acid |
| Aerosol TR-70 | Bis(tridecyl)ester of sodium sulfosuccinic acid |
| Aerosol AY-65 | Diamyl ester of sodium sulfosuccinic acid |

All the above are manufactured by American Cyanamid.

Referring to the chemical reactions written previously, the average n for the MPEG's used is as follows: MPEG 750: n=17; MPEG 3000; n=68; MPEG 5000: n=114. In general it may be said that n may range from about 10 to about 150, preferably from about 15 to about 120.

The examples which follow illustrate the invention in various useful embodiments, but are not intended to limit the invention in any way.

EXAMPLES

Example 1

Preparation of Surface Active $\alpha/\omega$-Dibutyl poly(isophorone carbodiimide) Using CARBOWAX® Methoxypolyethylene glycol (MPEG) 5000 as Hydrophile Into a 2000-ml resin kettle equipped with a heating mantle, mechanical stirrer, thermometer, and nitrogen purge were charged 486.50 g of amyl acetate, 420.15 g isophorone diisocyanate and 20.5 g Carbowax MPEG 5000. The solution was heated, with stirring, to 70° C., then 0.50 g of bismuth III octanoate (25% active in mineral oil) was added. After 30 minutes, 124.81 g of butyl isocyanate and 33 g of a 10% solution by weight of 3-methyl-1-phenyl-2-phospholene-1-oxide in xylene were charged. The solution was heated, with stirring, at 140° C. for 19 hours, then the solids adjusted to 43% by addition of 128.93 g of amyl acetate. The product was cooled and packaged (1055.2 g). The infrared spectrum of the surface-active polycarbodiimide showed elimination of the isocyanate peak (2260 cm$^{-1}$) with formation of the carbodiimide peak (2130 cm$^{-1}$).

Example 2

Dispersion of Product of Example 1 in Water

To 42.21 g of a water solution (2.08% triethylamine, by weight) were added 57.61 g of the surface-active polycarbodiimide from example 1, while stirring with a 3-blade impeller. After the addition of the polycarbodiimide, the mixture was stirred for 3 minutes with a 3-blade impeller, then the emulsion was homogenized for 3 minutes with a VirTus homogenizer. Analysis showed the droplet size to be about 1.44 microns.

Example 3

Preparation of Surface-Active $\alpha/\omega$-Dibutyl poly(isophorone carbodiimide) using CARBOWAX® Methoxypolyethylene glycol 3000 as Hydrophile The procedure was similar to that described in Example 1 except that Carbowax MPEG 3000 was substituted for Carbowax MPEG 5000.

Example 4

Dispersion of the Product of Example 3 in Water

The surface-active polycarbodiimide described in Example 3 was emulsified using the procedure described in Example 2. Analysis showed the droplet size to be about 1.82 microns.

Example 5

Preparation of Surface-Active $\alpha/\omega$-Dibutyl poly(isophorone carbodiimide) using CARBOWAX® Methoxypolyethylene glycol 750 as Hydrophile The procedure was similar to that described in Example 1 except that Carbowax MPEG 750 was substituted for Carbowax MPEG 5000.

Example 6

Dispersion of Product of Example 5 in Water

The surface-active polycarbodiimide described in Example 5 was emulsified using the procedure described in Example 2. Analysis showed the droplet size to be about 13.24 microns.

Example 7

Evaluation of the Products of Examples 1, 3, and 5 in the Presence of Anionic Surfactants The nonionic surface-active polycarbodiimides of examples 1,3, and 5 were evaluated in combination with various anionic surfactants. The desired nonionic surfactant levels were obtained by blending an $\alpha/\omega$-dibutyl poly(isophorone carbodiimide) which was not surface-active to the polycarbodiimides of Examples 1, 3, or 5. The procedure is general, and is as follows:

An oil phase and a water phase are prepared to have the following compositions:

| | Solids, % | Mass (g) |
| --- | --- | --- |
| Oil Phase | | |
| Example 1 | 43.0 | 26.65 |
| $\alpha,\omega$-dibutyl poly(isophorone carbodiimide) | 49.2 | 30.96 |
| Foamaster VF | — | 0.28 |
| Water Phase | | |
| Water | | 41.33 |
| Triethylamine | | 0.88 |

The oil phase is added to the water phase while stirring with a 3-blade impeller. The emulsion which forms is then homogenized for 3 minutes with a VirTus homogenizer. The solids level of the emulsion is 26.7%.

Using the above procedure, a series of samples were prepared as shown in Table I. In this table, all anionic surfactants are sulfonated soaps available from American Cyanamid. In order of increasing hydrophobicity, AY<AOT<TR.

TABLE I

| Sample | Examples | Mol. Wt. MPEG | Anionic Surfactant | Anionic/Nonionic Surfactant | Percent Total Surfactant |
|---|---|---|---|---|---|
| 1 | 1 | 5000 | AY-65 | 40/60 | 1.5 |
| 2 | 1 | 5000 | AOT-75 | 50/50 | 3.0 |
| 3 | 1 | 5000 | TR-70 | 60/40 | 2.25 |
| 4 | 2 | 3000 | AY-65 | 50/50 | 2.25 |
| 5 | 2 | 3000 | AOT-75 | 60/40 | 1.5 |
| 6 | 2 | 3000 | TR-70 | 40/60 | 3.0 |
| 7 | 3 | 750 | AY-65 | 60/40 | 3.0 |
| 8 | 3 | 750 | AOT-75 | 40/60 | 2.25 |
| 9 | 3 | 750 | TR-70 | 50/50 | 1.5 |

Evaluations of Samples 1–9 are shown in Table II.

TABLE II

| Trials | Droplet Size (Microns) | Brookfield Viscosity at 60 RPM (cps) | Appearance of Emulsion After 48 hours at 47° C. | Appearance of Emulsion After 18 days at 25° C. | Number of Freeze-Thaw Cycles Before Appearance of Oil Phase |
|---|---|---|---|---|---|
| 1 | 1.05 | 2900 | No change | No change | >4 |
| 2 | 0.49 | 5600 | No change | No change | >4 |
| 3 | 0.64 | 3500 | No change | No change | >4 |
| 4 | 0.63 | 787 | No change | No change | >4 |
| 5 | 0.68 | 86 | No change | No change | >4 |
| 6 | 0.58 | 125 | No change | No change | >4 |
| 7 | 9.29 | 76 | Oil separation | Oil separation | 0 |
| 8 | 0.54 | 85 | Oil separation | Oil separation | 0 |
| 9 | 0.66 | 65 | Oil separation | Oil separation | 0 |

Example 8

Preparation f a Water-dispersible Carbodiimide using CARBOWAX Methoxypolyethylene glycol 750 as Hydrophile To a 3-neck, 500 ml round bottom flask equipped with a mechanical stirrer and thermometer were charged 200 g of amyl acetate, 20.0 g (0.0900 mole) of isophorone diisocyanate, 40.0 g (0.0533 mole) of CARBOWAX methoxypolyethylene glycol 750, and 0.5 g of bismuth III octanoate (25% active in mineral oil). The contents of the flask were heated at 100° C. for 2 hours. The flask was then cooled and the crude isocyanate-terminated CARBOWAX methoxypolyethylene glycol precipitated by adding the contents of the flask to 500 ml of hexane. The product was washed 3 times with 50 ml portions of hexane, then dried overnight in a vacuum oven. The infrared spectrum of the material showed an isocyanate band (2240 cm$^{-1}$). The yield was 87.5%.

To prepare the "surface-active" carbodiimide, 7 g of 1,3,6-tri(N-isopropyl-N'-methylene carbodiimide) hexane (prepared by the bromotriphenyl phosphine bromide process (see Example 12), then made 47.8% active in amyl acetate) and 0.105 g of the above isocyanate-terminated CARBOWAX methoxypolywethylene glycol were heated in a small vial to 50° C. to form a homogeneous solution, then cooled to room temperature. After 24 hours, an infrared spectrum of the above material showed no detectable isocyanate band.

The dispersibility and reactivity of the above carbodiimide were evaluated in the formulation described below.

| | |
|---|---|
| UCAR 4620 (46.33% solids) | 100.91 g |
| Dimethylethanolamine in water (50%) | 0.40 g |
| Butyl CELLOSOLVE | 7.48 g |
| Water | 7.48 g |

While rapidly stirring the above partial formulation with a 3-blade impeller, 3.05 g (3 PHR) of the chemically modified carbodiimide described above were added and stirring continued for 5 minutes. Evaluations of the above formulation are shown in Table I.

TABLE I

| Oven Temperature °F. | Time (minutes) | Methyl Ethyl Ketone Double Rubs | Percent Carbodiimide Remaining in Polymer |
|---|---|---|---|
| 140 | 15 | 71 | 28.0 |
| 185 | 5 | 167 | 25.6 |
| 200 | 5 | +300 | 20.5 |
| 220 | 5 | +300 | 19.2 |
| 260 | 15 | +300 | 0.1 |

Notes:
a. Formulation: UCAR 4620, Butyl CELLOSOLVE, 16 PHR; Base, Dimehyle-thanolamine; pH, 8.4; Crosslinker, surface active form of 1,3,6-tri(N—isopropyl-N'—methylene carbodiimide) hexane, 3 PHR.
b. The 1,3,6-tri(N—isopropyl-N'—methylene carbodiimide) hexane was prepared by dehydration of the corresponding urea using bromotriphenylphosphine bromide; % NCN of theory was 84%.
c. The 1,3,6-tri(N—isopropyl-N'—methylene carbodiimide) hexane was chemically modified with 1% of an isocyanate terminated CARBOWAX methoxy polyethylene glycol with an average molecular weight of 972 g/mole.
d. The percent of carbodiimide remaining unreacted in the coating was determined by FT-IR ATR.
e. Wet films of the formulation were drawn down on Leneta paper using a #60 wire-wound rod, then cured in a forced air oven. The thickness of the dried coating was 1.2 ± 0.2 mils.

Example 9

Preparation of a Water-dispersible Carbodiimide Prepared from a Trifunctional Carbodiimide To a 3-neck, 500 ml round bottom flask equipped with a mechanical stirrer and thermometer were charged 200 g of amyl acetate, 20.0 g (0.0900 mole) of isophorone diisocyanate, 10.0 g (0.00200 mole) of CARBOWAX methoxypolyethylene glycol 5000, and 0.5 g of bismuth III octanoate (25% active in mineral oil). The contents of the flask were heated at 100° C. for 2 hours. The flask was then cooled and the crude isocyanate-terminated CARBOWAX methoxypolyethylene glycol precipitated by adding the contents of the flask to 500 ml of hexane. The product was washed with 50 ml of hexane, then dried in a vacuum oven at 25° C. to constant weight. The yield of the product was 100%.

To prepare the "surface-active" carbodiimide, 7.0 g of 1,3,6-tri(N-isopropyl-N'-methylene carbodiimide) hexane (prepared by the phosphine bromide process then made 47.8% active in amyl acetate) and 0.105 g of the above isocyanate-terminated CARBOWAX methoxypolyethylene glycol were heated in a small vial to 70° C., then cooled to room temperature.

The dispersibility and reactivity of the above carbodiimide were evaluated in the formulation described below.

| | |
|---|---|
| UCAR 4620 (46.33% solids) | 100.91 g |

| | -continued | |
|---|---|---|
| | Dimethylethanolamine in water (50%) | 0.40 g |
| | Butyl CELLOSOLVE | 7.48 g |
| | Water | 7.48 g |

While rapidly stirring the above partial formulation with a 3-blade impeller, 3.05 g (3 PHR) of the chemically modified carbodiimide described above were added and stirring continued for 5 minutes. Evaluations of the above formulation are shown in Table II.

TABLE II

| Oven Temperature °F. | Time (minutes) | Methyl Ethyl Ketone Double Rubs | Percent Carbodiimide Remaining in Polymer |
|---|---|---|---|
| 140 | 15 | 91 | 25.7 |
| 185 | 5 | 209 | 22.6 |
| 200 | 5 | +300 | 19.3 |
| 220 | 5 | +300 | 17.6 |
| 260 | 5 | +300 | 1.1 |

Notes:
a. Formulation: UCAR 4620, Butyl CELLOSOLVE, 16 PHR; Base, Dimethylethanolamine; pH, 8.4; Crosslinker, surface-active form of 1,3,6-tri(N—isopropyl-N'—methylene carbodiimide)hexane, 3 PHR.
b. The 1,3,6-tri(N—isopropyl-N'—methylene carbodiimide) hexane was prepared using the bromotriphenylphosphine bromide process; percent NCN of theory of 84%.
c. The 1,3,6-tri(N—isopropyl-N'—methylene carbodiimide) hexane was chemically modified with 1% of an isocyanate-terminated CARBOWAX methoxy polyethylene glycol with an average molecular weight of 5222 g/mole.
d. The percent of carbodiimide remaining unreacted in the coating was determined by FT IR ATR.
e. Wet films of the formulation were drawn down on Leneta paper using a #60 wire-wound rod, then cured in a forced air oven. The thickness of the dried coating was 1.2 ± 0.2 mils.

Example 10

Preparation of a Water-Dispersiable Carbodiimide

To prepare the "surface-active" carbodiimide, 14.0 g of 1,3,6-tri(N-cyclohexyl-N'-methylene carbodiimide) hexane (prepared by the hypochlorite process (see Example 13), then made 47.8% active in amyl acetate) and 0.211 g of an isocyanate-terminated CARBOWAX methoxypolyethylene glycol (average molecular weight, 972 g/mole, were heated in a small vial to 50° C. to obtain a homogeneous solution (<2 hours), then the solution was allowed to cool. An infrared spectrum of the above material showed no detectable isocyanate band.

The dispersibility and reactivity of the "surface-active" 1,3,6-tris(N-cyclohexyl-N''-methylene carbodiimide) hexane was evaluated in the formulation described below:

| | UCAR 4431 (42.3% solids) | 55.36 g |
|---|---|---|
| | Dimethylethanolamine in water (50%) | 0.30 g |
| | Butyl CELLOSOLVE | 3.74 g |
| | Water | 3.74 g |

While rapidly stirring the above partial formulation with a 3-blade impeller, 1.98 g (4 PHR) of the chemically modified carbodiimide described above were added and then stirring continued for 5 minutes. Evaluations of the above formulation are shown in Table III.

TABLE III

| Oven Temperature °F. | Time (minutes) | Methyl Ethyl Ketone Double Rubs |
|---|---|---|
| 140 | 2 | 73 |
| 140 | 15 | 126 |
| 185 | 5 | 185 |
| 200 | 5 | 182 |
| 260 | 15 | +300 |

Notes:
a. Formulation: UCAR 4431; Butyl CELLOSOLVE, 15.9 PHR; Base, Dimethylethanolamine, 0.63 PHR; pH, 8.13; Crosslinker, surface-active form of 1,3,6-tri(-N—cyclohexyl-N'—methylene carbodiimide)-hexane, 4 PHR.
b. Crosslinker was prepared by the hypochlorite process; percent NCN of theory was 73.7%.
c. The 1,3,6-tri(N—cyclohexyl-N'—methylene carbodiimide) hexane was chemically modified with 1% of an isocyanate-terminated CARBOWAX methoxypolyethylene glycol with an average molecular weight of 972 g/mole.
d. Wet films of the formulation were drawn down on Leneta paper using a #60 wire-wound rod, then cured in a forced air oven. The thickness of the dried coating was 1.2 ± 0.2 mils.

Example 11

Preparation of a Water-dispersiable Carbodiimide

To prepare the "surface-active" carbodiimide of higher surfactant level, 14.0 g of 1,3,6-tri(N-cyclohexyl-N''-methylene carbodiimide) hexane (prepared by the hypochlorite process, then made 47.8% active in amyl acetate) and 1.02 g of an isocyanate-terminated CARBOWAX methoxypolyethylene glycol (average molecular weight, 972 g/mole) were heated in a small vial to 50° C. to obtain a homogeneous solution (<2 hours), then the solution was allowed to cool.

The dispersibility and reactivity of the "surface-active" 1,3,6-tri(N-cyclohexyl-N''-methylene carbodiimide) hexane were evaluated in the formulation described below.

| | UCAR 4431 (42.3% solids) | 55.36 g |
|---|---|---|
| | Dimethylethanolamine in water (50%) | 0.30 g |
| | Butyl CELLOSOLVE | 3.74 g |
| | Water | 3.74 g |

While rapidly stirring the above partial formulation with a 3-blade impeller, 2.11 g (4 PHR) of the chemically-modified carbodiimide described above were added. The stirring was continued for 5 minutes. Evaluations of the above formulation are shown in Table IV.

TABLE IV

| Oven Temperature °F. | Time (minutes) | Methyl Ethyl Ketone Double Rubs |
|---|---|---|
| 140 | 2 | 101 |
| 185 | 5 | 300 |
| 200 | 5 | +300 |
| 260 | 15 | +300 |

Notes:
a. Formulation: UCAR 4431; Butyl CELLOSOLVE, 15.9 PHR; Base, Dimethylethanolamine, 0.63 PHR; pH, 8.02; Crosslinker, surface-active form of 1,3,6-tri(-N—cyclohexyl-N'—methylene carbodiimide)-hexane, 4 PHR.
b. Crosslinker was prepared by the hypochlorite process; percent NCN of theory was 73.7%.
c. The 1,3,6-tri(N—cyclohexyl-N'—methylene carbodiimide) hexane was chemically modified with 7% of an isocyanate-terminated CARBOWAX methoxypolyethylene glycol with an average molecular weight of 972 g/mole.
d. Wet films of the formulation were drawn down on Leneta paper using a #60 wire wound rod, then cured in a forced air oven. The thickness of the dried coating was 1.2 ± 0.2 mils.

Example 12

Preparation of 1,3,6-tri(N-isopropyl-N''-methylene carbodiimide) hexane

Into a 3-neck, 5000 ml, round-bottom flask equipped with a thermometer, mechanical stirrer, and pressure-equalizung dropping funnel were charged 484.59 g (1.847 moles of triphenylphosphine and 2585 ml of dried methylene chloride. The contents of the flask were cooled to 1° C., then 295.2 g (1.847 moles) of bromine dissolved in 200 ml of methylene chloride were dropped into the stirred triphenylphosphine solution over a 1.73-hour period while maintaining the temperature of the contents of the flask between 1° and 6° C. After the addition of the bromine solution, 377.7 g (3.733 moles) of triethylamine were added to the bromotriphenylphosphine bromide solution over a 1.3-hour period while maintaining the temperature between 0° and 1° C.

To prepare the multifunctionalcarbodiimide, 220.0 g (0.5132 mole) of 1,3,6-tri(N-isopropyl-N'-methylene urea) hexane were added portionwise to the stirred solution of bromotriphenylphosphine bromide solution over a 1-hour period while maintaining the temperature of the contents in the flask between 0° and 2° C. After the addition of the urea, the contents of the flask were stirred for 1.75 hours.

After the reaction period, triphenylphosphine oxide and triethyl hydrogen bromide were filtered from the methylene chloride solution containing the carbodiimide. The solution containing the multifunctional carbodiimide was then washed with 4175 g of cold water. The polycarbodiimide solution was then dried overnight over 4 Å molecular sieves.

The methylene chloride was then removed using a roto-evaporator at 38° C. (345 mm Hg). The vacuum was gradually increased to 5 mm Hg. The 1,3,6-tri(N-isopropyl-N'-methylene carbodiimide) hexane was then extracted from the triphenylphosphine oxide residue with four 1400 ml portions of hexane. The extracts were filtered, then combined to form a clear solution of the multifunctional carbodiimide in hexane. The hexane was removed using a roto-evaporator at 38° C. (115 mm Hg) until 350 ml of solution remained. The solution was refiltered, and most of the remaining hexane removed using a roto-evaporator at 38° C. (7 mm Hg).

The infrared spectrum of the clear amber oil showed a large carbodiimide band (2130 cm$^{-1}$). The carbodiimide solution, which was 94.2% active in hexane, had a Brookfield viscosity of 14 cps LVT #1 spindle at 60 rpm). The equivalent Gardner Bubble viscosity was 0.144 Stoke. The yield of the carbodiimide was 80.3%. Titration of an aliquot by the procedure of Zarembo and Watss (Microchem. J. Symp. Ser., 2, 591 (1962) yielded a carbodiimide functionality of 26.8% (theory 32.0%). The theoretical functionality of the material was 3.

Example 13

Preparation of 1,3,-6-tri(N-cyclohexyl-N'-methylene carbodiimide) hexane from a Trifunctional Thiourea) by the Hypochlorite Process Into a 3-neck, 500 ml round bottom flask equipped with a thermometer, bubbler, and mechanical stirrer were charged 3665 ml of water and 426.99 g (10.676 moles) of sodium hydroxide. The basic water solution was cooled to −5° C., then 257.91 g (3.628 moles) of chlorine were bubbled into the basic water solution while maintaining the temperature between −3° and −5° C.

To prepare the carbodiimide, 173.92 g (0.2913 moles) of 1,3,6-tri(N-cyclohexyl-N''-methylene thiourea) hexane in 376.55 g of methylene chloride were added to the stirred hypochlorite solution over a 3-minute period. After the addition of the thiourea, the reaction was run for 4 hours while maintaining the temperature between 5° and 8° C. The contents of the reactor were then cooled to −5° C., then the organic phase separated from the water layer. The organic phase was filtered to remove residual sulfur, washed with 100 ml of water, then dried overnight over a bed of 4 Å molecular sieves.

After drying, the organic phase was refiltered, and the methylene chloride removed using a roto-evaporator at 38° C. (345 mm Hg). During the removal of the methylene chloride, the temperature was gradually increased over a 2-hour period to 50° C. (7 mm Hg). The infrared spectrum of the amber oil showed a large carbodiimide band (2130 cm$^{-1}$). The carbodiimide solution was 90.3% active carbodiimide in methylene chloride. The yield of carbodiimide was 69.1%. Titration of an aliquot by the procedure of Zarembo and Watts yielded a percent carbodiimide functionality of 18.8% (theory 25.5%). The theoretical functionality of the material was 3.

I claim:

1. A surface-active polycarbodiimide of the formula wherein R is a residue of a hydrophobic organic compound containing at least two carbodiimide groups; R' is a residue of an organic compound having a hydrophilic segment and at least one functional group capable of reacting with a carbodiimide group; and X is a group formed by the reaction of a said carbodiimide group with a said functional group; wherein R' is a residue of a hydroxyl-containing poly(alkylene oxide)-based surfactant and wherein the poly(alkylene oxide)-based surfactant is alkoxy-capped.

2. A surface-active polycarbodiimide of claim 1 wherein the poly(alkylene oxide)-based surfactant is a methoxypolyethylene glycol.

3. A surface-active polycarbodiimide of claim 1 wherein the number of alkylene oxide repeating units (n) is from about 15 to about 120.

* * * * *